United States Patent
Bai et al.

(10) Patent No.: US 8,179,636 B1
(45) Date of Patent: May 15, 2012

(54) METHOD AND SYSTEM FOR PROVIDING A PERPENDICULAR MAGNETIC RECORDING WRITER

(75) Inventors: Zhigang Bai, Milpitas, CA (US); Lisha Wang, Fremont, CA (US); Tao Pan, San Jose, CA (US); Yugang Wang, Milpitas, CA (US); Matthew R. Gibbons, San Jose, CA (US); Sining Mao, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 1106 days.

(21) Appl. No.: 12/042,691

(22) Filed: Mar. 5, 2008

(51) Int. Cl.
*G11B 5/31* (2006.01)
(52) U.S. Cl. .................................. 360/125.17
(58) Field of Classification Search ............... 360/125.17
See application file for complete search history.

(56) References Cited

U.S. PATENT DOCUMENTS

| | | | |
|---|---|---|---|
| 6,198,597 B1 | 3/2001 | Tateyama et al. | |
| 6,728,064 B2 | 4/2004 | Sato et al. | |
| 6,901,651 B2 | 6/2005 | Sato et al. | |
| 6,922,316 B2 | 7/2005 | Sato et al. | |
| 7,102,854 B2 | 9/2006 | Wang et al. | |
| 7,180,705 B2 * | 2/2007 | Matono et al. | 360/125.12 |
| 7,196,871 B2 * | 3/2007 | Hsu et al. | 360/125.03 |
| 7,219,414 B2 | 5/2007 | Watabe et al. | |
| 7,245,454 B2 | 7/2007 | Aoki et al. | |
| 7,253,992 B2 | 8/2007 | Chen et al. | |
| 7,359,147 B2 * | 4/2008 | Nishikawa et al. | 360/125.33 |
| 7,433,152 B2 * | 10/2008 | Watabe et al. | 360/125.08 |
| 7,518,826 B2 * | 4/2009 | Matono et al. | 360/125.02 |
| 7,522,376 B2 * | 4/2009 | Matono et al. | 360/125.02 |
| 2007/0195454 A1 | 8/2007 | Kimura et al. | |

* cited by examiner

*Primary Examiner* — Mark Blouin

(57) ABSTRACT

A method and system for providing a magnetic transducer for recording to media is described. The method and system include providing a first pole, a main pole, an auxiliary pole, and at least one coil. The main pole has a first media-facing surface including a recessed portion and a write portion. The auxiliary pole is magnetically coupled with the main pole and has a second media-facing surface. The second media-facing surface includes a first portion and a second portion. The first portion is in proximity to the write portion of the first media-facing surface of the main pole. The second portion is in proximity to and recessed from the recessed portion of the first media-facing surface of the main pole. The coil(s) are for energizing the main pole.

24 Claims, 9 Drawing Sheets

US 8,179,636 B1

METHOD AND SYSTEM FOR PROVIDING A PERPENDICULAR MAGNETIC RECORDING WRITER

BACKGROUND

FIG. 1 depicts a side view of a conventional perpendicular magnetic recording (PMR) head 1 used in recording a PMR media (not shown). FIG. 2 depicts a top view of the conventional PMR head 1. Referring to FIGS. 1-2, the conventional PMR head 1 includes a read transducer 2 and a PMR write transducer 10. The conventional read transducer 2 includes shields 4 and 8 and read sensor 6. The conventional PMR transducer 10 includes a conventional first pole (P1) 12, a first coil 14, conventional auxiliary poles 16 and 20, a conventional main pole 18 having a flared region 19 and pole tip 21, conventional write gap 22, a conventional second coil 24, and shield 26. Although the conventional PMR transducer 10 is depicted with two coils 14 and 24, a single coil may also be used.

In order to write data to a PMR media, the coils 14 and 24 are energized. Consequently, the main pole 18 is magnetized and the media written by flux from the pole tip 21. Based on the direction of current through the coils 14 and 24, the direction of magnetic flux through the main pole 18 changes. Thus, bits having opposing magnetization can be written and the desired data stored on the PMR media. When the conventional PMR transducer 10 is not writing, no current is driven through the coils 14 and 24.

The conventional PMR head 10 is desired to be used at higher recording densities. In such applications, domain lockup, also termed remanent erasure, can be an issue. Domain lockup occurs when the conventional PMR transducer 10 inadvertently erases data in the PMR media when no current energizes the PMR head 10. This occurs due to a remanent field remaining the main pole 18. Domain lockup is sensitive to the shape anisotropy of the pole tip 21. A long nose length, NL, or the length of the pole tip 21 from the air-bearing surface (ABS) to the flaring point of the flared region 19, is more likely to cause domain lockup. Without lamination of the main pole 18, the nose length typically is no greater than about twice of the physical track width (perpendicular to the page in FIG. 1). Consequently, most PMR transducers 10 have a short nose length. For such PMR transducers 10, the primary cause of pole erasure is the magnetic domains in the yoke that may not fully relax after writing. Stated differently, the main pole 18 may not completely demagnetize after writing. Further, the pole tip 21 is sufficiently small that such deviations of the magnetization domains in the main pole 18 from a perfectly demagnetized state may produce significant magnetization in the pole tip 21. As a result, a high remanent field may be present in the PMR media even when no current is driven through the coils 14 and 24. This remanent field may erase data recorded on the PMR media after the head 10 passes over the media for many revolutions. Because it involves this inadvertent erasure, domain lockup is undesirable. Further, domain lockup may also result in other issues, such as catastrophic failure of the hard drive if the servo areas are erased by the remanent field of the conventional PMR transducer 10.

In order to reduce the remanence of the conventional main pole 18, the width, w, of the conventional main pole 18 may be large. For example, the width, w, may be on the order of ten through twenty microns. Although the remanent field of the main pole 18 is reduced, during writing, magnetic charges 30 may be developed on the auxiliary pole 16 and/or 20. Such charges 30 produce a significant off-track field. The off-track field may inadvertently write to the other tracks not desired to be written. Stated differently, the auxiliary pole 16/20 may produce a field that causes adjacent track erasure. Thus, performance of the conventional PMR head 1 may still be adversely affected.

In addition, the conventional auxiliary poles 16/20 are also recessed from the ABS by a relatively small amount. For example, in some conventional PMR transducers 10, the front portion of the auxiliary poles 16/20 is recessed from the pole tip 21 by approximately one-half to one micron. Because of the small size of the recess, the conventional auxiliary pole 16/20 may be capable of delivering a large flux to the conventional main pole 18. However, the large amount of magnetic flux delivered to the conventional main pole 18 causes the write field for the conventional PMR head 10 to increase with increasing current. Stated differently, the field in the pole tip 21 may be larger than desired. Consequently, the write width is increased, adversely affecting the track width. In addition, this makes effect it more difficult for the drive using the conventional PMR head 1 to optimize the write current.

Accordingly, what is needed is a system and method for reducing domain lockup in a PMR head substantially without unduly sacrificing performance.

BRIEF SUMMARY OF THE INVENTION

A method and system for providing a magnetic transducer for recording to media is described. The method and system include providing a first pole, a main pole, an auxiliary pole, and at least one coil. The main pole has a first media-facing surface including a recessed portion and a write portion. The auxiliary pole is magnetically coupled with the main pole and has a second media-facing surface. The second media-facing surface includes a first portion and a second portion. The first portion is in proximity to the write portion of the first media-facing surface of the main pole. The second portion is in proximity to and recessed from the recessed portion of the first media-facing surface of the main pole. The coil(s) are for energizing the main pole.

DETAILED DESCRIPTION OF THE PREFERRED EMBODIMENTS

Figure 1:
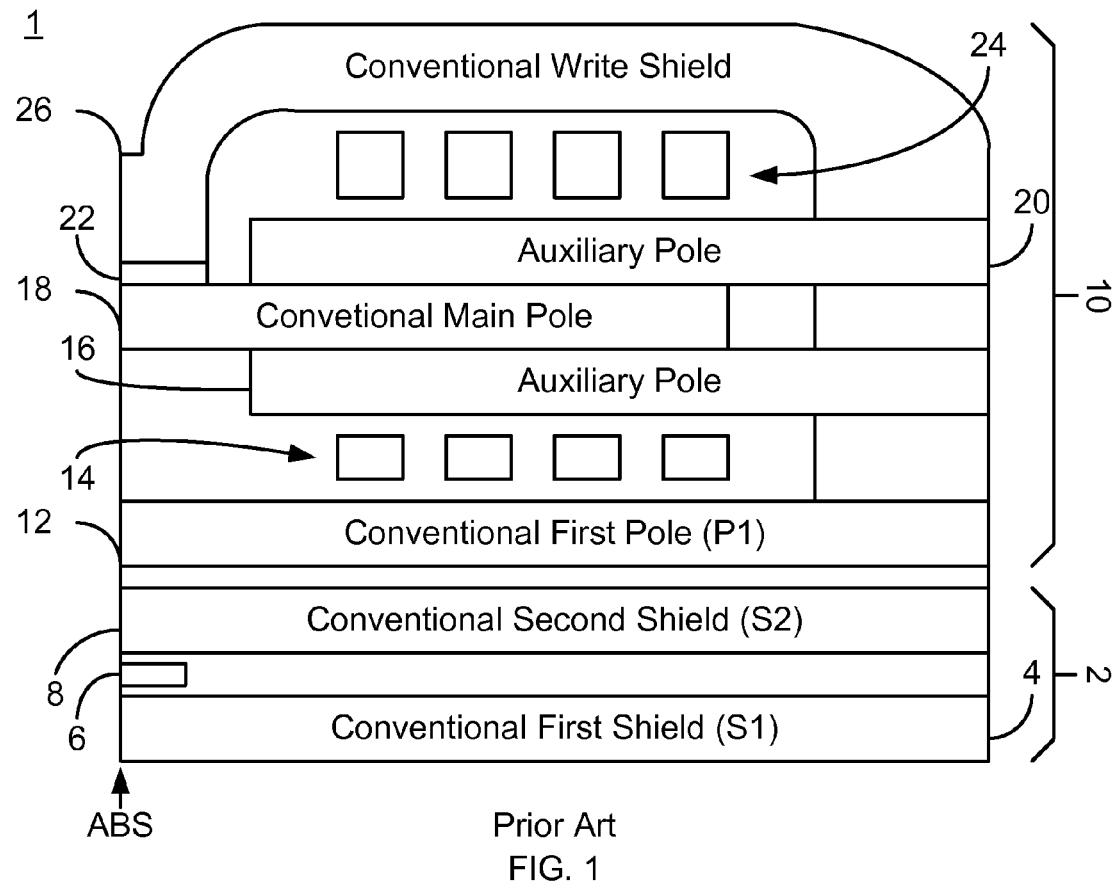
FIG. 1 is a side view of a conventional perpendicular magnetic recording head.
Figure 2:
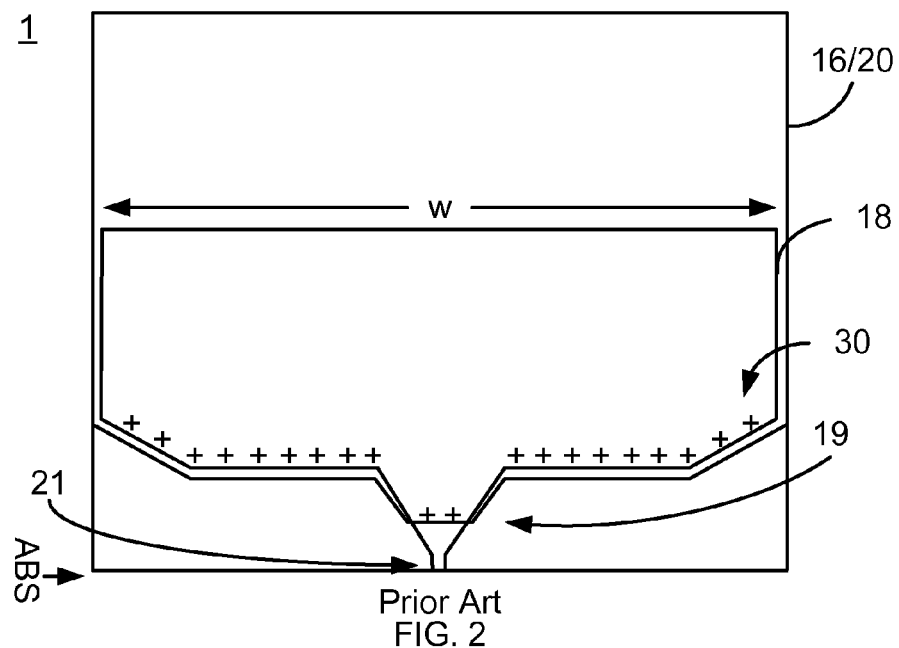
FIG. 2 depicts a top view of the conventional perpendicular magnetic recording head.
Figure 3:
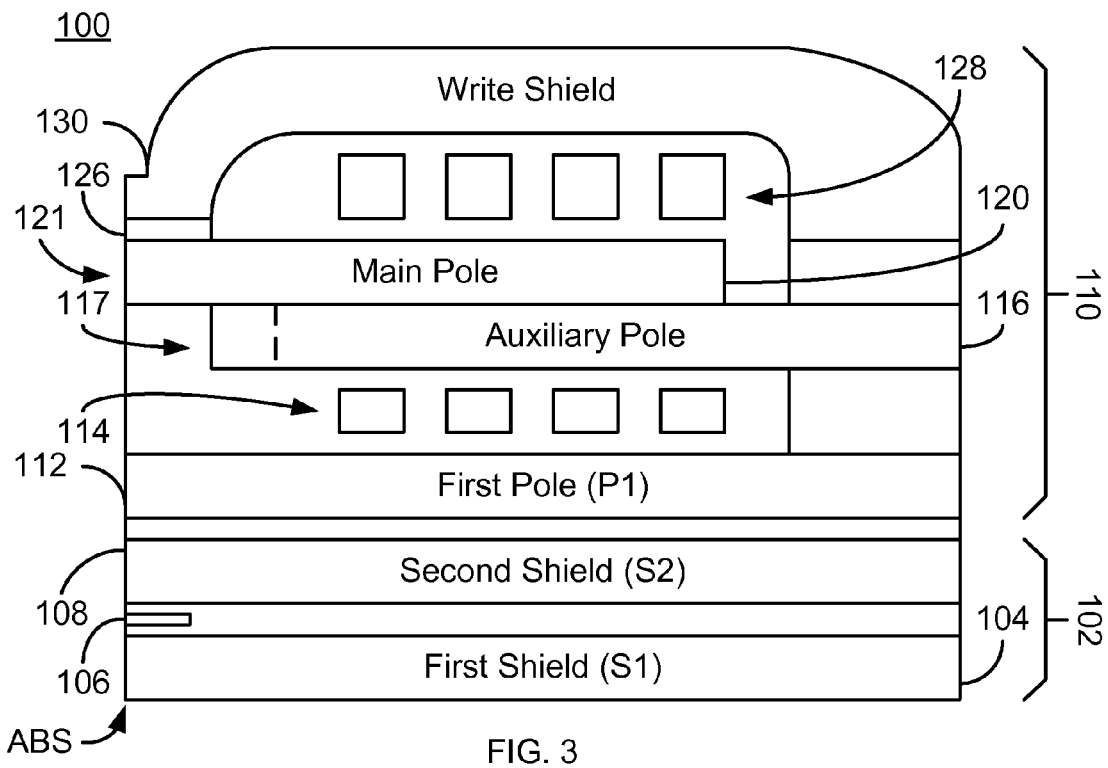
FIG. 3 is a side view of an exemplary embodiment of a magnetic recording head.
Figure 4:
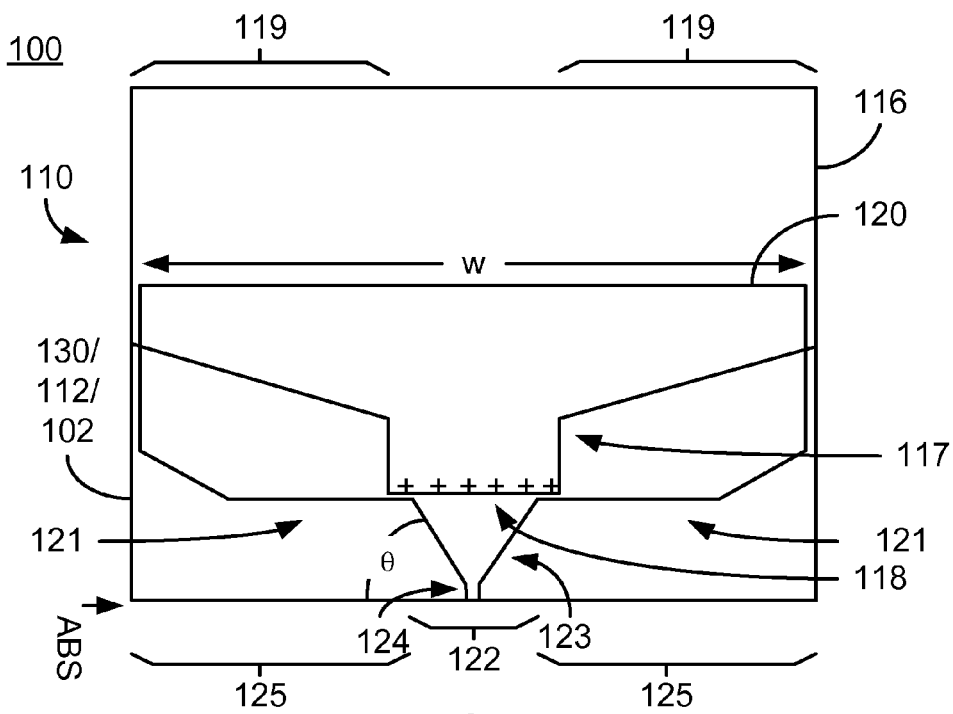
FIG. 4 depicts a top view of an exemplary embodiment of the magnetic recording head.

FIG. 3 is a side view of an exemplary embodiment of a magnetic recording head 100. FIG. 4 depicts a top view of the exemplary embodiment of the magnetic recording head 100. For clarity, only a portion of the magnetic recording head 100 is shown in FIG. 4. Referring to FIGS. 3-4, in one embodiment, the magnetic recording head 100 is a PMR head. For clarity, FIGS. 3-4 are not drawn to scale.

The magnetic recording head 100 includes a read transducer 102 and a write transducer 110. The read transducer 102 includes shields 104 and 108 and read sensor 106. The write transducer 110 includes a first pole (P1) 112, a first coil 114, auxiliary pole 116, a main pole 120, write gap 126, a second coil 128, and shield 130. Although the write transducer 110 is depicted with two coils 114 and 128, a single coil may also be used. In addition, although the auxiliary pole 116 is depicted as below the main pole 120, the auxiliary pole 116 may reside above the main pole 120. In addition, in some embodiment, a second auxiliary pole may be provided. In such an embodiment, the main pole may reside between the auxiliary pole 116 and the second auxiliary pole (not shown in FIGS. 3-4)

The main pole 120 is used to write to the media (not shown). The main pole 120 includes a media-facing surface 121. A write portion 122 of the media-facing surface 121 is used to write to the media. The write portion 122 includes a flared region 123 and pole tip 124. The pole tip 124 resides at the part of the write portion 122 that is closest to the media (not shown). Thus, in the embodiment shown, the pole tip 124 resides substantially at the ABS. The write portion 122 is thus closest to the ABS. The remaining, recessed portion 125, is removed from the ABS. In one embodiment, the flared region 123 is approximately one to two microns deep. In one such embodiment, the flared region 123 is approximately 1.5 micron deep. Thus, the recessed portion 125 would be approximately one to two micron from the ABS. In addition, the main pole 120 is also desired to have a large width. In one embodiment, the width, w, may be on the order of ten through twenty microns. In addition, in one embodiment, the flared region 123 has a relatively high flare angle, $\theta$, from the ABS. For example, in one embodiment, the flare angle is at least forty-five degrees and not more than sixty-five degrees.

The auxiliary pole 116 is magnetically coupled with the main pole 120. The auxiliary pole 116 also has a media-facing surface 117. A first portion 118 of the media facing surface 117 is in proximity to the write portion 122 of the main pole 120. The second portion 119 of the media-facing surface 117 is in proximity to and recessed from the recessed portion 125 of the main pole 120. Thus, the media-facing surface 117 of the auxiliary pole 116 is not conformal with the media facing surface 121 of the main pole 120. The second portion 119 may increase distance from the ABS with increasing distance from the pole tip 124. For example, in the head 100 shown, the distance from the ABS of the second portion 119 of the media-facing surface 117 increases linearly with distance from the pole tip 124. In addition, the first portion 118 is behind and not conformal with the flared region 123 of the main pole 120. In the embodiment shown, the width of the first portion 118 is approximately the same as the flared region 123.

Because of the configuration of the poles 116 and 120, the head 100 may exhibit improved performance. The configuration of the main pole 120 may reduce the domain lockup of the write transducer 110. Further, only the first portion 118 of the auxiliary pole 116 is in proximity to the write portion 122 of the main pole 120. The second portion 119 is recessed even from the recessed portion 125. Thus, as shown in FIG. 4, only magnetic charges developed at the front of the first portion 118 of the auxiliary pole 116 contribute significantly to the magnetic field outside of the region around the pole tip 124. Consequently, the side field due to the second portion 119 may be significantly reduced. Thus, adjacent track writing may be reduced. Further, because the first portion 118 is recessed from the flared region 123, the desired flux choking may be achieved. In other words, the desired flux may be provided in the pole tip 124. This is particularly true if the main pole 120 has the high flared region angle and a relatively short nose length. As a result, the main pole 120 may saturate at the desired level. Thus, performance of the head 100 may be further improved.

Figure 5:
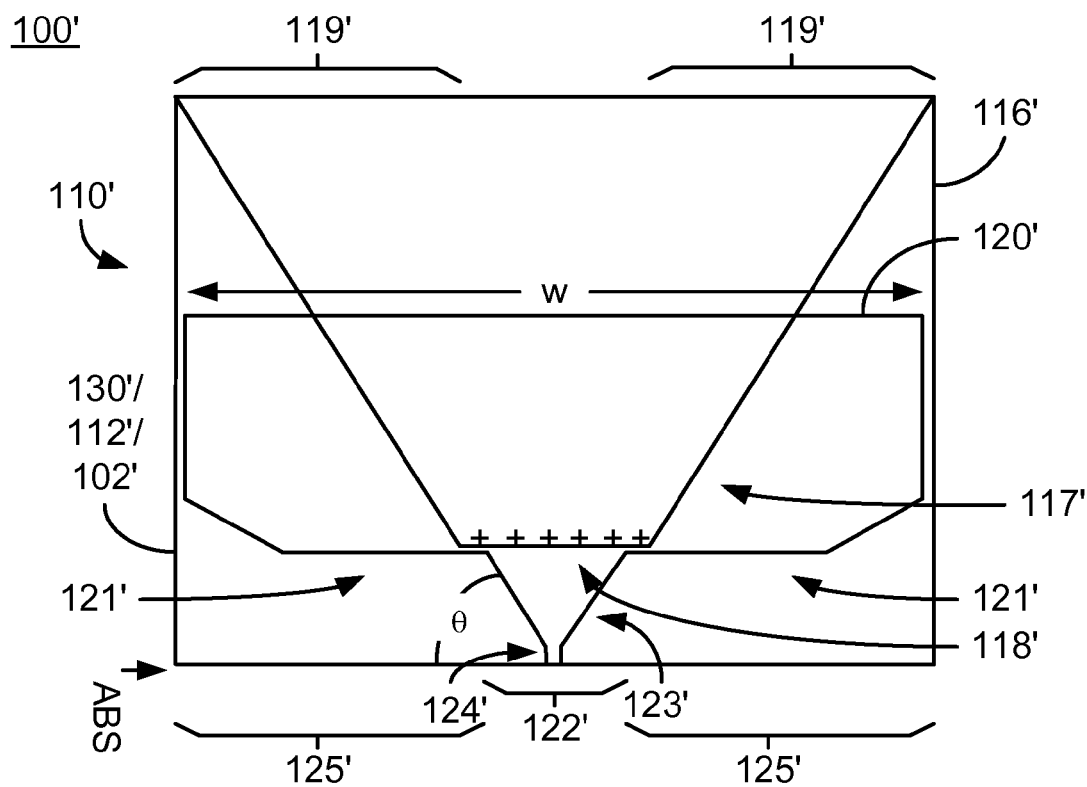
FIG. 5 depicts a top view of another exemplary embodiment of the magnetic recording head.

FIG. 5 depicts a top view of another exemplary embodiment of the magnetic recording head 100'. A side view of the magnetic recording head 100' may correspond to the magnetic recording head 100 depicted in FIG. 3 and is, therefore, not shown. For clarity, only a portion of the magnetic recording head 100' is shown in FIG. 5. For clarity, FIG. 5 is not drawn to scale. The magnetic recording head 100' is analogous to the magnetic recording head 100. Consequently, analogous components would have a similar label. Thus, the magnetic recording head 100' would include a read transducer (not shown) and a write transducer 110' that are analogous to and include similar components as the read transducer 102 and write transducer 110, respectively. The write transducer 110' includes a P1 112', auxiliary pole 116', a main pole 120', write gap (not explicitly shown in FIG. 5), one or more coils (not explicitly shown in FIG. 5), and shield 130'.

The main pole 120' is used to write to the media (not shown) and thus includes a media-facing surface 121'. Write portion 122' including flared region 123' and pole tip 124', as well as recessed portion 125' are analogous to the write portion 122, flared region 123, pole tip 124, and recessed portion 125. The pole tip 124' thus resides at the part of the write portion 122' that is closest to the media (not shown) and is substantially at the ABS. The write portion 122' is thus closest to the ABS. The recessed portion 125' is removed from the ABS. In one embodiment, the flared region 123' is approximately one to two microns deep. In one such embodiment, the flared region 123' is approximately 1.5 micron deep. Thus, the recessed portion 125' would be approximately one to two micron from the ABS. In addition, the main pole 120' is also desired to have a large width. For example, the width, w, may be on the order of ten through twenty microns. In addition, the flared region 123' may have a relatively high flare angle, $\theta$, from the ABS. For example, in one embodiment, the flare angle is at least forty-five degrees and not more than sixty-five degrees.

The auxiliary pole 116' is magnetically coupled with the main pole 120'. The auxiliary pole 116' also has a media-facing surface 117'. A first portion 118' of the media facing surface 117' is in proximity to the write portion 122' of the main pole 120'. The second portion 119' of the media-facing surface 117' is in proximity to and recessed from the recessed portion 125' of the main pole 120'. Thus, the media-facing surface 117' of the auxiliary pole 116' is not conformal with the media facing surface 121' of the main pole 120'. The second portion 119' linearly increases distance from the ABS with increasing distance from the pole tip 124'. In addition, the first portion 118' is recessed from and not conformal with the flared region 123' of the main pole 120'. In the embodiment shown, the width of the first portion 118' is approximately the same as the flared region 123'.

For similar reasons, as the head 100, performance of the head 100' may be improved. In particular, the configuration of the main pole 120' may reduce the domain lockup of the write transducer 110'. Further, only magnetic charges at the first portion 118 of the auxiliary pole 116' in proximity to the write portion 122' of the main pole 120' provides a significant contribution to the side fields. Thus, adjacent track writing may be reduced. Further, because the first portion 118' is recessed from the flared region 123', the desired flux choking may be achieved. As a result, the main pole 120' may saturate at the desired level. Thus, performance of the head 100' may be further improved.

Figure 6:
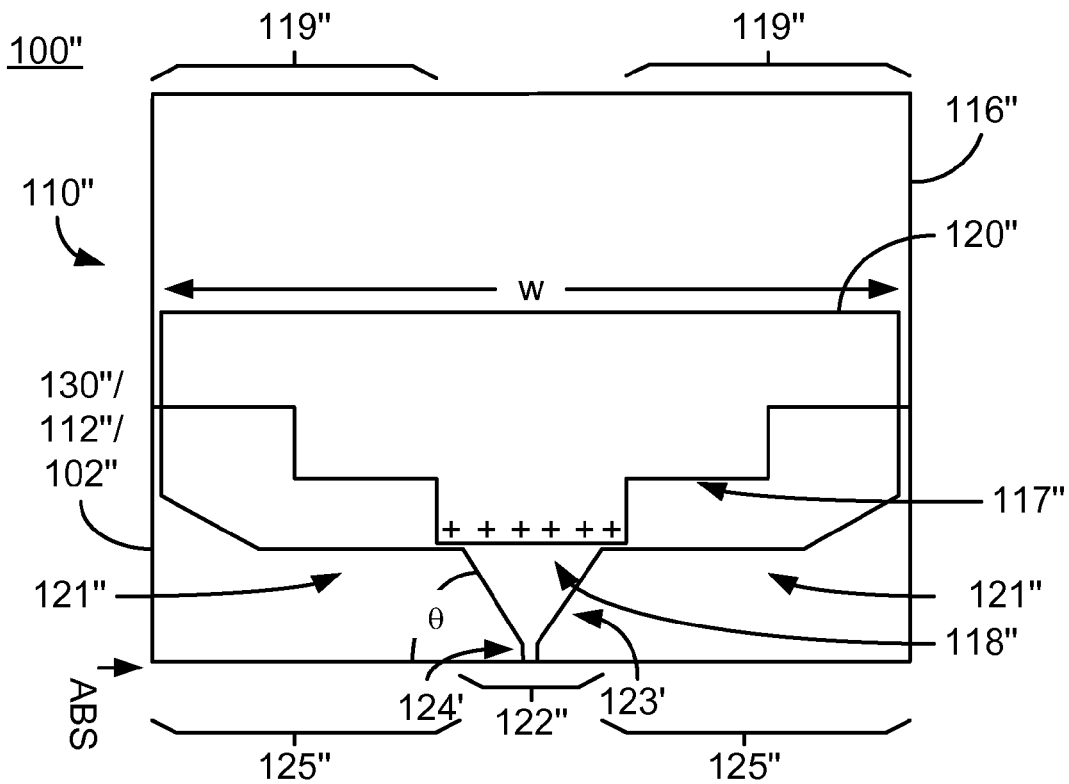
FIG. 6 depicts a top view of another exemplary embodiment of the magnetic recording head.

FIG. 6 depicts a top view of another exemplary embodiment of the magnetic recording head 100'. A side view of the magnetic recording head 100" may correspond to the magnetic recording head 100 depicted in FIG. 3 and is, therefore, not shown. For clarity, only a portion of the magnetic recording head 100" is shown in FIG. 6. For clarity, FIG. 6 is not drawn to scale. The magnetic recording head 100" is analogous to the magnetic recording heads 100 and 100'. Consequently, analogous components are labeled similarly. Thus, the magnetic recording head 100" would include a read transducer (not shown) and a write transducer 110" that are analogous to and include similar components as the read transducer 102 and write transducer 110, respectively. The write transducer 110" includes a P1 112", auxiliary pole 116", a main pole 120", write gap (not explicitly shown in FIG. 6), one or more coils (not explicitly shown in FIG. 6), and shield 130".

The main pole 120" is used to write to the media (not shown) and thus includes a media-facing surface 121". Write portion 122" including flared region 123" and pole tip 124", as well as recessed portion 125" are analogous to the write portion 122, flared region 123, pole tip 124, and recessed portion 125. The pole tip 124" thus resides at the part of the write portion 122" that is closest to the media (not shown) and is substantially at the ABS. The write portion 122" is thus closest to the ABS. The recessed portion 125" is removed from the ABS. In one embodiment, the flared region 123" is approximately one to two microns deep. In one such embodiment, the flared region 123" is approximately 1.5 micron deep. Thus, the recessed portion 125" would be approximately one to two micron from the ABS. In addition, the main pole 120" is also desired to have a large width. For example, the width, w, may be on the order of ten through twenty microns. In addition, the flared region 123" may have a relatively high flare angle, θ, from the ABS. For example, in one embodiment, the flare angle is at least forty-five degrees and not more than sixty-five degrees.

The auxiliary pole 116" is magnetically coupled with the main pole 120". The auxiliary pole 116" also has a media-facing surface 117". A first portion 118" of the media facing surface 117" is in proximity to the write portion 122" of the main pole 120". The second portion 119" of the media-facing surface 117" is in proximity to and recessed from the recessed portion 125" of the main pole 120". Thus, the media-facing surface 117" of the auxiliary pole 116" is not conformal with the media facing surface 121" of the main pole 120". The distance of the second portion 119" from the ABS exhibits stepped increases with increasing distance from the pole tip 124". In addition, the first portion 118" is recessed from and not conformal with the flared region 123" of the main pole 120". In the embodiment shown, the width of the first portion 118" is approximately the same as the flared region 123".

For similar reasons, as the heads 100 and 100', performance of the head 100" may be improved. In particular, domain lockup may be reduced while maintaining a reduction in adjacent track writing. Further, the main pole 120" may saturate at the desired level. Thus, performance of the head 100" may be further improved.

Figure 7:
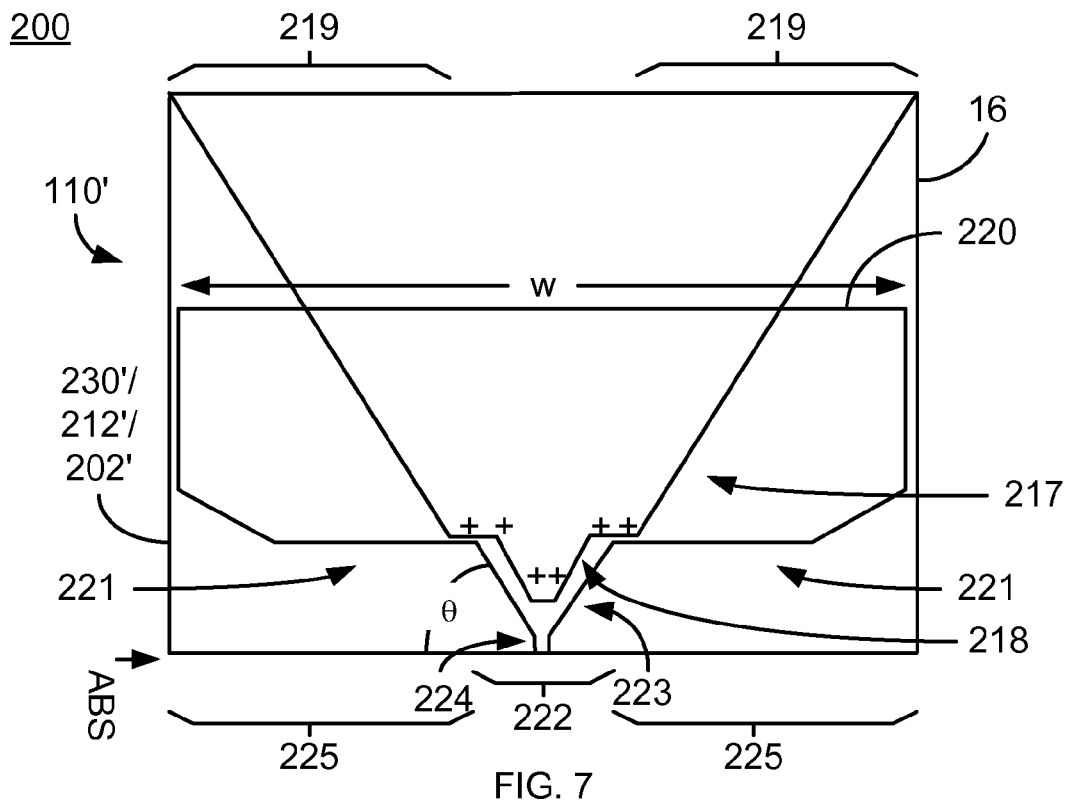
FIG. 7 depicts a top view of another exemplary embodiment of the magnetic recording head.

FIG. 7 depicts a top view of another exemplary embodiment of the magnetic recording head 200. A side view of the magnetic recording head 200 may correspond to the magnetic recording head 100 depicted in FIG. 3 and is, therefore, not shown. For clarity, only a portion of the magnetic recording head 200 is shown in FIG. 7. For clarity, FIG. 7 is not drawn to scale. The magnetic recording head 200 is analogous to the magnetic recording heads 100, 100', and 100". Consequently, analogous components are labeled similarly. Thus, the magnetic recording head 200 would include a read transducer (not shown) and a write transducer 210 that are analogous to and include similar components as the read transducer 102 and write transducer 110, respectively. The write transducer 210 includes a P1 212, auxiliary pole 216, a main pole 220, write gap (not explicitly shown in FIG. 7), one or more coils (not explicitly shown in FIG. 7), and shield 230.

The main pole 220 is used to write to the media (not shown) and thus includes a media-facing surface 221. Write portion 222 including flared region 223 and pole tip 224, as well as recessed portion 225 are analogous to the write portion 122, flared region 123, pole tip 124, and recessed portion 125. The pole tip 224 thus resides at the part of the write portion 222 that is closest to the media (not shown) and is substantially at the ABS. The write portion 222 is thus closest to the ABS. The recessed portion 225 is removed from the ABS. In one embodiment, the flared region 223 is approximately one to two microns deep. In one such embodiment, the flared region 223 is approximately 1.5 micron deep. Thus, the recessed portion 225 would be approximately one to two micron from the ABS. In addition, the main pole 220 is also desired to have a large width. For example, the width, w, may be on the order of ten through twenty microns. In addition, the flared region 223 may have a relatively high flare angle, θ, from the ABS. For example, in one embodiment, the flare angle is at least forty-five degrees and not more than sixty-five degrees.

The auxiliary pole 216 is magnetically coupled with the main pole 220. The auxiliary pole 216 also has a media-facing surface 217. A first portion 218 of the media facing surface 217 is in proximity to the write portion 222 of the main pole 220. The second portion 219 of the media-facing surface 217 is in proximity to and recessed from the recessed portion 225 of the main pole 220. Thus, the media-facing surface 217 of the auxiliary pole 216 is not conformal with the media facing surface 221 of the main pole 220. The distance of the second portion 219 from the ABS linearly increases with increasing distance from the pole tip 224. The second portion 219 of the write transducer 210 is most analogous to the second portion 119' of the write transducer 110' depicted in FIG. 5. However, the first portion 218 differs from the corresponding portion 118' of the media-facing surface 117' of the auxiliary pole 116'. The first portion 218 may be slightly recessed from the flared region 223 of the main pole 220. However, the first portion 218 is also substantially conformal with the flared region 223 of the main pole 220. In the embodiment shown, the width of the first portion 218 is approximately the same as the flared region 223.

For similar reasons, as the heads 100, 100', and 100", performance of the head 200 may be improved. In particular, domain lockup may be reduced while maintaining a reduction in adjacent track writing. Further, the main pole 220 may saturate at the desired level. Thus, performance of the head 200 may be further improved.

Figure 8:
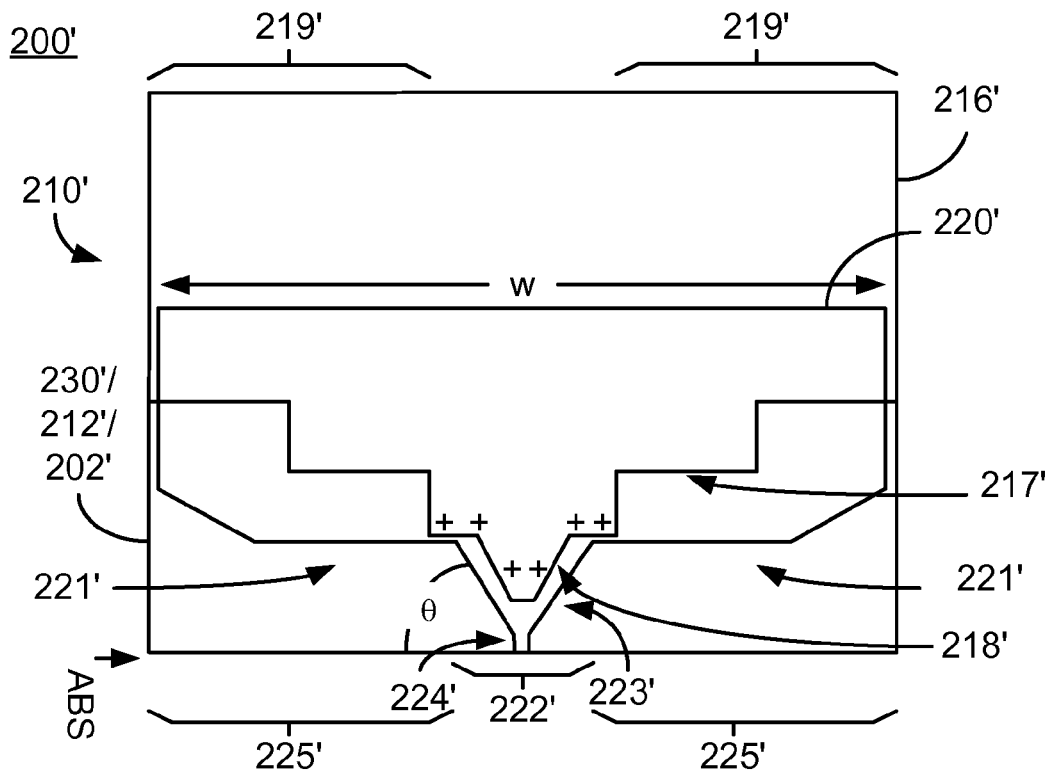
FIG. 8 depicts a top view of another exemplary embodiment of the magnetic recording head.

FIG. 8 depicts a top view of another exemplary embodiment of the magnetic recording head 200'. A side view of the magnetic recording head 200' may correspond to the magnetic recording head 100 depicted in FIG. 3 and is, therefore, not shown. For clarity, only a portion of the magnetic recording head 200' is shown in FIG. 8. For clarity, FIG. 8 is not drawn to scale. The magnetic recording head 200' is analogous to the magnetic recording heads 100, 100', 100", and 200. Consequently, analogous components are labeled similarly. Thus, the magnetic recording head 200' would include a read transducer (not shown) and a write transducer 210' that are analogous to and include similar components as the read transducer 102 and write transducer 110, respectively. The write transducer 210' includes a P1 212', auxiliary pole 216', a main pole 220', write gap (not explicitly shown in FIG. 8), one or more coils (not explicitly shown in FIG. 8), and shield 230'.

The main pole 220' is used to write to the media (not shown) and thus includes a media-facing surface 221'. Write portion 222' includes a flared region 223' and pole tip 224' that are analogous to the write portion 122, flared region 123/223, and pole tip 124/224, respectively. The recessed portion 225' is analogous to the recessed portion 125/225. The pole tip 224' thus resides at the part of the write portion 222' that is closest to the media (not shown) and is substantially at the ABS. The write portion 222' is thus closest to the ABS. The recessed portion 225' is removed from the ABS. In one embodiment, the flared region 223' is approximately one to two microns deep. In one such embodiment, the flared region 223' is approximately 1.5 micron deep. Thus, the recessed portion 225' would be approximately one to two micron from the ABS. In addition, the main pole 220' is also desired to have a large width. For example, the width, w, may be on the order of ten through twenty microns. In addition, the flared region 223' may have a relatively high flare angle, θ, from the ABS. For example, in one embodiment, the flare angle is at least forty-five degrees and not more than sixty-five degrees.

The auxiliary pole 216' is magnetically coupled with the main pole 220'. The auxiliary pole 216' also has a media-facing surface 217'. A first portion 218' of the media facing surface 217' is in proximity to the write portion 222' of the main pole 220'. The second portion 219' of the media-facing surface 217' is in proximity to and recessed from the recessed portion 225' of the main pole 220'. Thus, the media-facing surface 217' of the auxiliary pole 216' is not conformal with the media facing surface 221' of the main pole 220'. The distance of the second portion 219' from the ABS exhibits stepped increases with increasing distance from the pole tip 224'. The second portion 219' of the write transducer 210' is most analogous to the second portion 119" of the write transducer 110" depicted in FIG. 6. However, the first portion 218' differs from the corresponding portion 118" of the media-facing surface 117" of the auxiliary pole 116". The first portion 218' may be slightly recessed from the flared region 223' of the main pole 220'. However, the first portion 218' is also substantially conformal with the flared region 223' of the main pole 220'. In the embodiment shown, the width of the first portion 218' is approximately the same as the flared region 223'.

For similar reasons, as the heads 100, 100', 100", and 200, performance of the head 200' may be improved. In particular, domain lockup may be reduced while maintaining a reduction in adjacent track writing. Further, the main pole 220' may saturate at the desired level. Thus, performance of the head 200' may be further improved.

Figure 9:
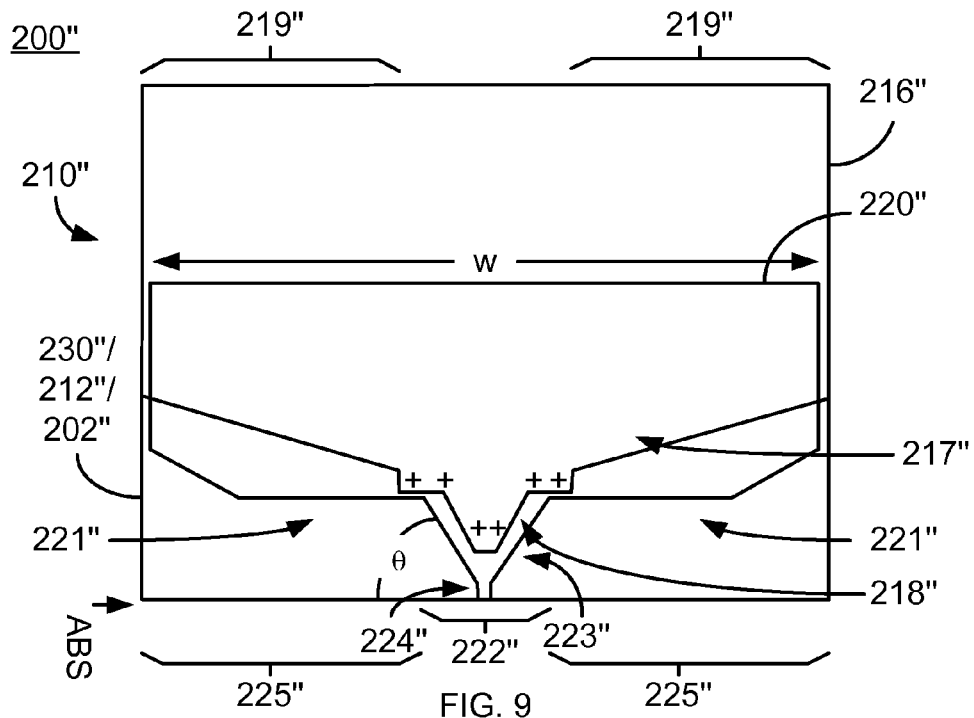
FIG. 9 depicts a top view of another exemplary embodiment of the magnetic recording head.

FIG. 9 depicts a top view of another exemplary embodiment of the magnetic recording head 200". A side view of the magnetic recording head 200" may correspond to the magnetic recording head 100 depicted in FIG. 3 and is, therefore, not shown. For clarity, only a portion of the magnetic recording head 200" is shown in FIG. 9. For clarity, FIG. 9 is not drawn to scale. The magnetic recording head 200" is analogous to the magnetic recording heads 100, 100', 100", 200, and 200'. Consequently, analogous components are labeled similarly. Thus, the magnetic recording head 200" would include a read transducer (not shown) and a write transducer 210" that are analogous to and include similar components as the read transducer 102 and write transducer 110, respectively. The write transducer 210" includes a P1 212", auxiliary pole 216", a main pole 220", write gap (not explicitly shown in FIG. 9), one or more coils (not explicitly shown in FIG. 9), and shield 230".

The main pole 220" is used to write to the media (not shown) and thus includes a media-facing surface 221". Write portion 222" includes a flared region 223" and pole tip 224" that are analogous to the write portion 122/222, flared region 123/223, and pole tip 124/224, respectively. The recessed portion 225" is analogous to the recessed portion 125/225. The pole tip 224" thus resides at the part of the write portion 222" that is closest to the media (not shown) and is substantially at the ABS. The write portion 222" is thus closest to the ABS. The recessed portion 225" is removed from the ABS. In one embodiment, the flared region 223" is approximately one to two microns deep. In one such embodiment, the flared region 223" is approximately 1.5 micron deep. Thus, the recessed portion 225" would be approximately one to two micron from the ABS. In addition, the main pole 220" is also desired to have a large width. For example, the width, w, may be on the order of ten through twenty microns. In addition, the flared region 223" may have a relatively high flare angle, θ, from the ABS. For example, in one embodiment, the flare angle is at least forty-five degrees and not more than sixty-five degrees.

The auxiliary pole 216" is magnetically coupled with the main pole 220". The auxiliary pole 216" also has a media-facing surface 217". A first portion 218" of the media facing surface 217" is in proximity to the write portion 222" of the main pole 220". The second portion 219" of the media-facing surface 217" is in proximity to and recessed from the recessed portion 225" of the main pole 220". Thus, the media-facing surface 217" of the auxiliary pole 216" is not conformal with the media-facing surface 221" of the main pole 220'. The distance of the second portion 219" from the ABS increases with increasing distance from the pole tip 224". The second portion 219" of the write transducer 210" is most analogous to the second portion 119 of the write transducer 110 depicted in FIG. 4. Referring back to FIG. 9, however, the first portion 218" differs from the corresponding portion 118 of the media-facing surface 117 of the auxiliary pole 116. The first portion 218" may be slightly recessed from the flared region 223" of the main pole 220". However, the first portion 218" is also substantially conformal with the flared region 223" of the main pole 220". In the embodiment shown, the width of the first portion 218" is approximately the same as the flared region 223".

For similar reasons, as the heads 100, 100', 100", 200, and 200' performance of the head 200" may be improved. In particular, domain lockup may be reduced while maintaining a reduction in adjacent track writing. Further, the main pole 220" may saturate at the desired level. Thus, performance of the head 200" may be further improved.

Figure 10:
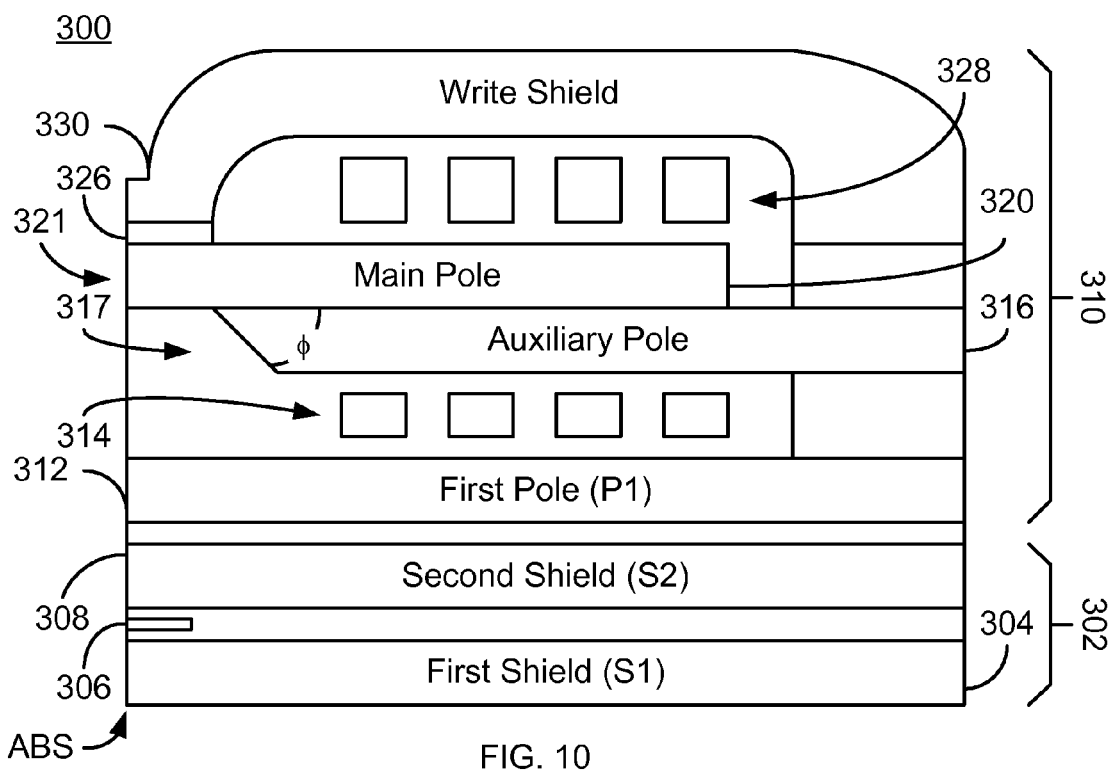
FIG. 10 is a side view of another exemplary embodiment of a magnetic recording head.

FIG. 10 is a side view of another exemplary embodiment of a magnetic recording head 300. In one embodiment, the magnetic recording head 300 is a PMR head. For clarity, FIG. 10 is not drawn to scale. The magnetic recording head 300 is analogous to the magnetic recording heads 100, 100', 100", 200, 200', and 200". Consequently, analogous components are labeled similarly. Thus, the magnetic recording head 300 includes a read transducer 302 and a write transducer 310 that are analogous to and include similar components as the read transducer 102 and write transducer 110, respectively. The read transducer 302 includes shields 304 and 308 and read sensor 306. The write transducer 310 includes a P1 312, a first coil 314, auxiliary pole 316, a main pole 320, write gap 326, a second coil 328, and shield 330. Although the write transducer 310 is depicted with two coils 314 and 328, a single coil may also be used.

The main pole may have a structure and function analogous to that of the main poles 120, 120', 120", 220, 220', and 220". Thus, the main pole 320 includes a media-facing surface 321 including a write portion (not separately shown in FIG. 10) and a read portion (not separately shown in FIG. 10). The write portion may include a flared region (not separately shown in FIG. 10) and pole tip (not separately shown in FIG. 10). The structure and locations of these features of the main pole 320 may be analogous to the main poles 120, 120', 120", 220, 220', and 220".

The structure and function of the auxiliary pole 316 is analogous to that of the auxiliary poles 116, 116', 116", 216, 216', and 216". Thus, the auxiliary pole 316 also has a media-facing surface 317. The media-facing surface 317 is analogous to the media facing surface 117, 117', 117", 217, 217', or 217" depicted in FIGS. 4-9. Thus, the media-facing surface 317 includes a first portion (not separately shown in FIG. 10) in proximity to the write portion of the main pole 320 and a second portion (not separately shown in FIG. 10) in proximity to and recessed from the recessed portion of the main pole 320. The media-facing surface 317 of the auxiliary pole 316 is not conformal with the media-facing surface 321 of the main pole 320. Instead, the second portion that is distal from the write portion of the main pole is recessed from the recessed portion of the main pole 320. Further, the second portion of the media-facing surface 317 that is distal from the write portion of the main pole 320 may increase distance from the ABS with increasing distance from the pole tip. The first portion of the write surface 317 may have approximately the same width as the flared region of the main pole 320. This portion also may, or may not be conformal with the flared region of the main pole 320.

In addition, the media-facing surface 317 of the auxiliary pole 316 is tapered such that the media-facing surface 317 is farther from the ABS with increasing distance from the main pole 320. Thus, as can be seen in FIG. 10, the media-facing surface 317 is farther from the ABS in a downward direction from the main pole 320. In the embodiment shown, the taper is linear. In one embodiment, the taper angle, φ, is at least thirty degrees and not more than seventy degrees. In another embodiment, the taper angle, φ, is not more than sixty degrees. In one embodiment, the taper angle, φ, is approximately forty-five degrees.

Because of the configuration of the poles 316 and 320, the head 300 may exhibit performance improvements analogous to those that may be achieved for the heads 100, 100', 100", 200, 200', and 200". The configuration of the main pole 320 may reduce the domain lockup of the write transducer 310. The configuration of the auxiliary pole may reduce adjacent track writing and improve flux choking, as described above. In addition, use of the taper may allow for a thicker auxiliary pole 316 without placing additional magnetic charges in proximity to the media (not shown). Because the auxiliary pole 316 is tapered, magnetic charges near the bottom of the auxiliary pole 316 are recessed from the ABS and, therefore, the media. Consequently, even if the auxiliary pole 316 has increased thickness, the bottom portion of the auxiliary pole 316 may not contribute to the field near the tip of the main pole 320. Thus, adjacent track writing may be improved.

Figure 11:
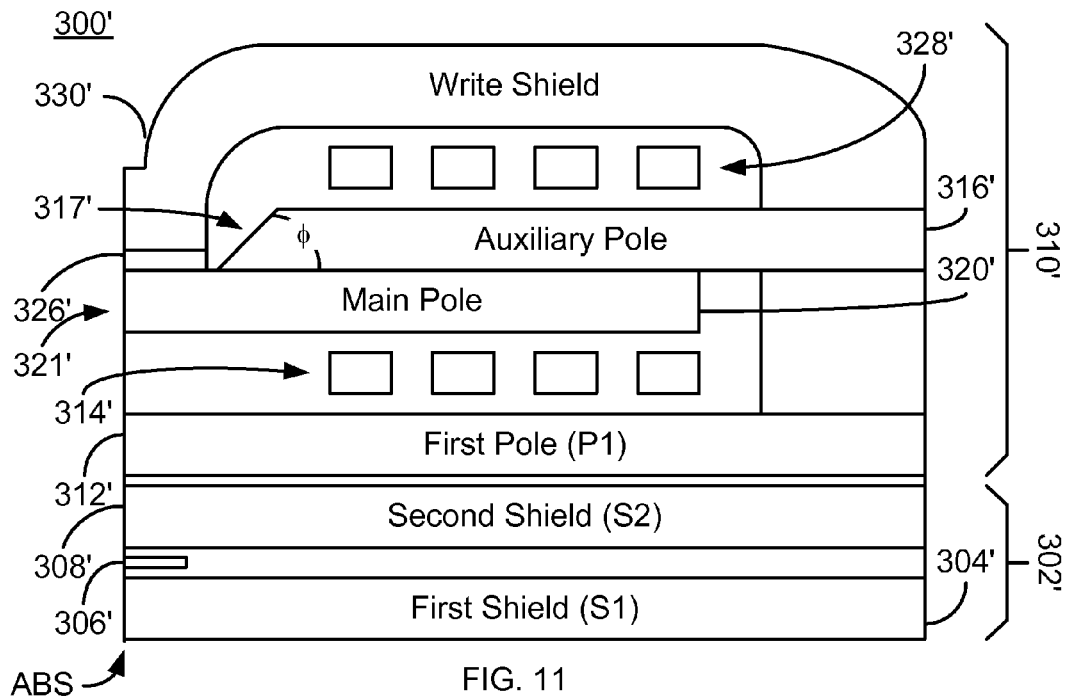
FIG. 11 is a side view of another exemplary embodiment of a magnetic recording head.

FIG. 11 is a side view of another exemplary embodiment of a magnetic recording head 300'. For clarity, FIG. 11 is not drawn to scale. The magnetic recording head 300' is analogous to the magnetic recording head 300 and, therefore, the magnetic recording heads 100, 100', 100", 200, 200', and 200". Consequently, analogous components are labeled similarly. Thus, the magnetic recording head 300' includes a read transducer 302' and a write transducer 310' that are analogous to and include similar components as the read transducer 102 and write transducer 110, respectively. The read transducer 302' includes shields 304' and 308' and read sensor 306'. The write transducer 310' includes a P1 312', a first coil 314', auxiliary pole 316', a main pole 320', write gap 326', a second coil 328', and shield 330'. Although the write transducer 310' is depicted with two coils 314' and 328', a single coil may also be used.

The main pole 320' may have a structure and function analogous to that of the main poles 120, 120', 120", 220, 220', 220", and 320. Thus, the main pole 320' includes a media-facing surface 321' including a write portion (not separately shown in FIG. 11) and a read portion (not separately shown in FIG. 11). The write portion may include a flared region (not separately shown in FIG. 11) and pole tip (not separately shown in FIG. 11). The structure and locations of these features of the main pole 320' may be analogous to the main poles 120, 120', 120", 220, 220', 220", and 320.

The structure and function of the auxiliary pole 316' is analogous to that of the auxiliary poles 116, 116', 116", 216, 216', 216", and 316'. Thus, the auxiliary pole 316' also has a media-facing surface 317'. The media-facing surface 317' is analogous to the media facing surface 117, 117', 117", 217, 217', or 217" as depicted in FIGS. 4-9, as well as the media-facing surface 317. The media-facing surface 317' of the auxiliary pole 316' is not conformal with the media-facing surface 321' of the main pole 320'. In addition, the media-facing surface 317' of the auxiliary pole 316 is tapered such that the media-facing surface 317' is farther from the ABS with increasing distance from the main pole 320'. However, the auxiliary pole 316' is above the main pole 320'. Thus, as can be seen in FIG. 11, the media-facing surface 317' is farther from the ABS in an upward direction from the main pole 320'. In the embodiment shown, the taper is linear. In one embodiment, the taper angle, φ, is at least thirty degrees and not more than seventy degrees. In another embodiment, the taper angle, φ, is not more than sixty degrees. In one embodiment, the taper angle, φ, is approximately forty-five degrees. In one embodiment, the taper may be omitted. A non-tapered auxiliary pole 316' may be used when the shield 330 is present. However, in other embodiments, the shield 330 may be omitted. In such an embodiment, the taper for the auxiliary pole 316' may have greater utility.

Because of the configuration of the poles 316' and 320', the head 300' may exhibit performance improvements analogous to those that may be achieved for the heads 100, 100', 100", 200, 200', 200", and 300. The configuration of the main pole 320 may reduce the domain lockup of the write transducer 310. In addition, the head 300' may have reduced adjacent track writing and improved flux choking. In addition, use of the taper may allow for a thicker auxiliary pole 316' without placing additional magnetic charges in proximity to the media (not shown). Consequently, even if the auxiliary pole 316' has increased thickness, the bottom portion of the auxiliary pole 316' may not contribute to the field near the tip of the main pole 320'. Thus, adjacent track writing may be improved.

Figure 12:
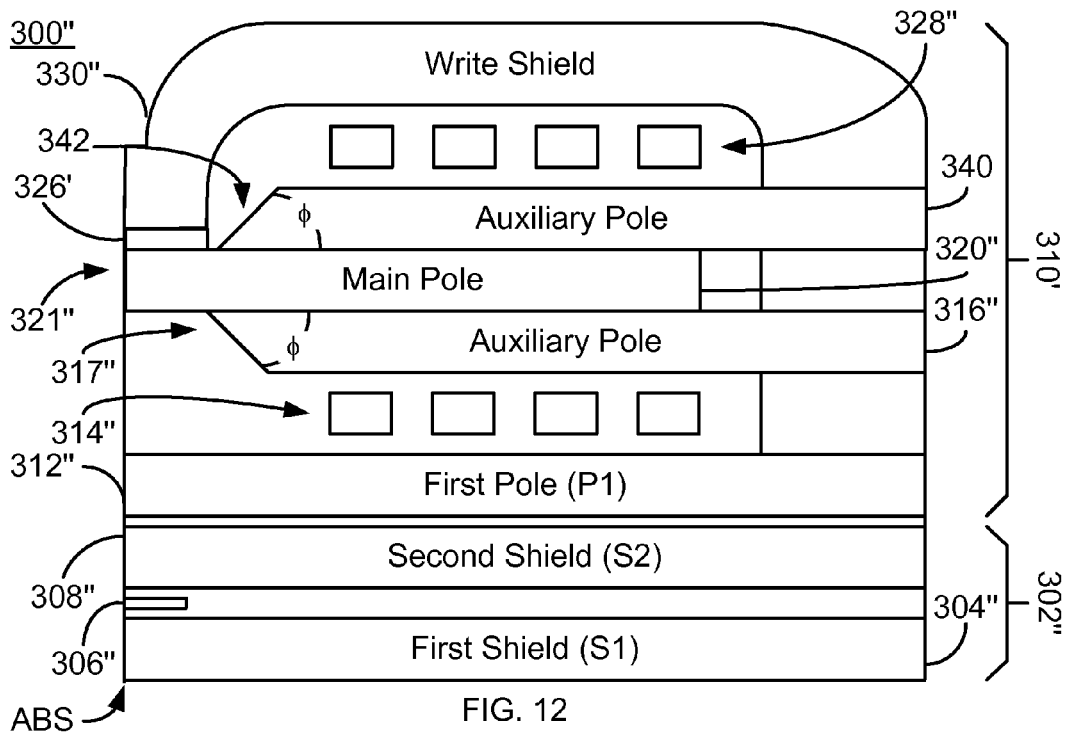
FIG. 12 is a side view of another exemplary embodiment of a magnetic recording head.

FIG. 12 is a side view of another exemplary embodiment of a magnetic recording head 300". For clarity, FIG. 12 is not drawn to scale. The magnetic recording head 300" is analogous to the magnetic recording heads 300 and 300' and, therefore, the magnetic recording heads 100, 100', 100", 200, 200', and 200". Consequently, analogous components are labeled similarly. Thus, the magnetic recording head 300" includes a read transducer 302" and a write transducer 310" that are analogous to and include similar components as the read transducer 102 and write transducer 110, respectively. The read transducer 302" includes shields 304" and 308" and read sensor 306". The write transducer 310" includes a P1 312", a first coil 314', a first auxiliary pole 316", a main pole 320", write gap 326", a second coil 328", and shield 330". In addition, the write head 310' includes an additional auxiliary pole 340. Thus, the main pole 320" is sandwiched between the auxiliary poles 316" and 340. Although the write transducer 310" is depicted with two coils 314" and 328", a single coil may also be used.

The main pole 320" may have a structure and function analogous to that of the main poles 120, 120', 120", 220, 220', 220", 320, and 320'. Thus, the main pole 320' includes a media-facing surface 321' including a write portion (not separately shown in FIG. 12) and a read portion (not separately shown in FIG. 12). The write portion may include a flared region (not separately shown in FIG. 12) and pole tip (not separately shown in FIG. 12). The structure and locations of these features of the main pole 320" may be analogous to the main poles 120, 120', 120", 220, 220', and 220".

The structure and function of the auxiliary pole 316" and/or 340 is analogous to that of the auxiliary poles 116, 116', 116", 216, 216', 216", 316 and 316'. However, the auxiliary pole 316" is below the main pole 320", while the auxiliary pole 340 is above the main pole 320". The media facing surface 317" of the auxiliary pole may not be conformal with the media-facing surface 321" of the main pole. The media-facing surface 342 of the auxiliary pole may not be conformal with the media-facing surface 321" of the main pole. The auxiliary pole 316" and/or the auxiliary pole 340 my have the cross-sections, as viewed from the top, as any of the poles 116, 116', 116", 216, 216', 216". In one embodiment, the cross-sections, as viewed from the top, of the auxiliary pole 316" and 340 may be the same. In another embodiment, the cross-sections, as viewed from the top, of the auxiliary pole 316" and 340 may be different. Further, in one embodiment, one cross-section for a pole 316" or 340 is conformal with the main pole 320", while the other is not.

The media-facing surface 317" of the auxiliary pole 316" is tapered such that the media-facing surface 317" is farther from the ABS with increasing distance from the main pole 320'. The media-facing surface 342 of the auxiliary pole 340 may be tapered in an analogous manner, particularly if the shield 330" is omitted. Thus, as can be seen in FIG. 12, the media-facing surface 317' is farther from the ABS in a downward direction from the main pole 320'. Similarly, the media-facing surface 342 may be farther from the ABS in an upward direction from the main pole 320". In another embodiment only one of the auxiliary poles 316" and 340 is tapered. For example, in one embodiment, the auxiliary pole 316" is tapered, but the auxiliary pole 340 is not. In another embodiment, the auxiliary pole 340 is tapered, but the auxiliary pole 316" is not. In the embodiment shown, the tapers are linear. In one embodiment, the taper angles, ϕ, is at least thirty degrees and not more than seventy degrees. In another embodiment, the taper angle, ϕ, is not more than sixty degrees. In one embodiment, the taper angle, ϕ, is approximately forty-five degrees.

Because of the configuration of the poles 316", 320", and 340, the head 300" may exhibit performance improvements analogous to those that may be achieved for the heads 100, 100', 100", 200, 200', 200", 300, and 300'. In particular, domain lockup, flux choking, and adjacent track writing may be improved.

Figure 13:
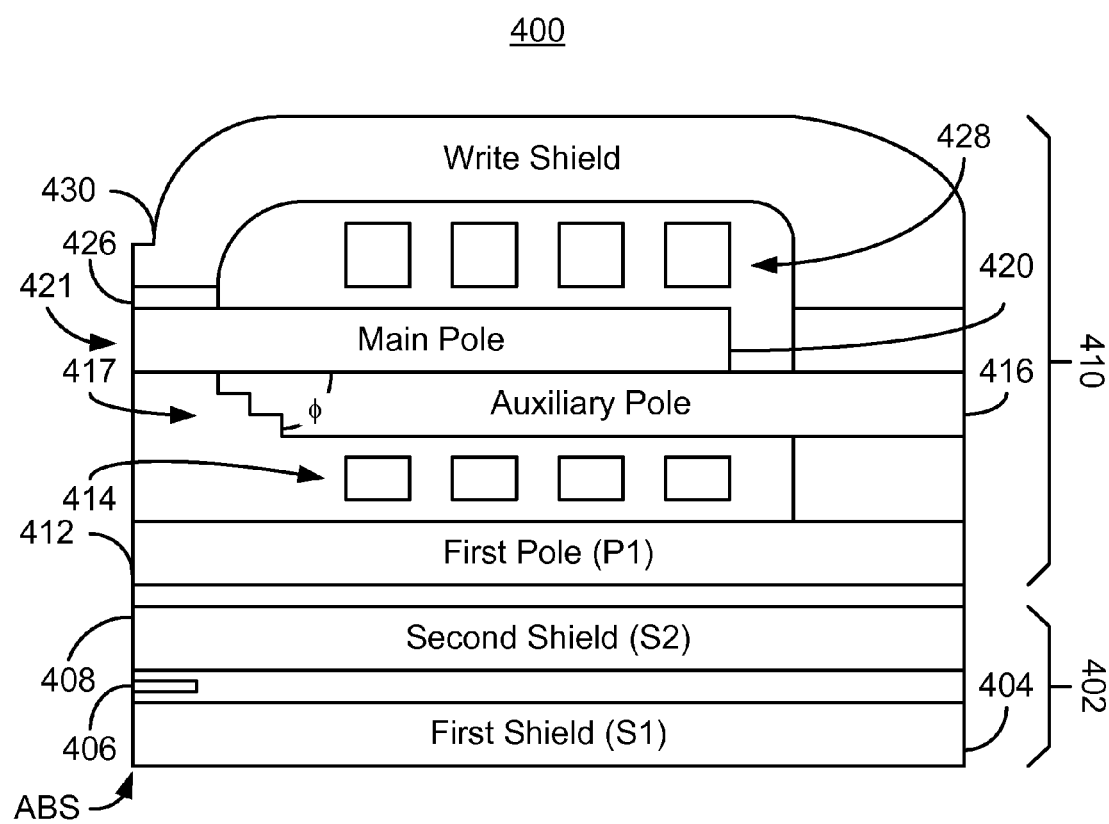
FIG. 13 is a side view of another exemplary embodiment of a magnetic recording head.

FIG. 13 is a side view of another exemplary embodiment of a magnetic recording head 400. In one embodiment, the magnetic recording head 400 is a PMR head. For clarity, FIG. 13 is not drawn to scale. The magnetic recording head 300 is analogous to the magnetic recording heads 100, 100', 100", 200, 200', 200", 300, 300', and 300". Consequently, analogous components are labeled similarly. Thus, the magnetic recording head 400 includes a read transducer 402 and a write transducer 410 that are analogous to and include similar components as the read transducer 102/302 and write transducer 110/310, respectively. The read transducer 402 includes shields 404 and 408 and read sensor 406. The write transducer 410 includes a P1 412, a first coil 414, auxiliary pole 416, a main pole 420, write gap 426, a second coil 428, and shield 430. Although the write transducer 410 is depicted with two coils 414 and 428, a single coil may also be used.

The main pole may have a structure and function analogous to that of the main poles 120, 120', 120", 220, 220', 220", 320, 320', and 320". Thus, the main pole 420 includes a media-facing surface 421 including a write portion (not separately shown in FIG. 13) and a read portion (not separately shown in FIG. 13). The write portion may include a flared region (not separately shown in FIG. 13) and pole tip (not separately shown in FIG. 13). The structure and locations of these features of the main pole 420 may be analogous to the main poles 120, 120', 120", 220, 220', 220", 320, 320', and 320".

The structure and function of the auxiliary pole 416 is analogous to that of the auxiliary poles 116, 116', 116", 216, 216', and 216". Thus, the auxiliary pole 416 also has a media-facing surface 417. The media-facing surface 417 is analogous to the media facing surface 117, 117', 117", 217, 217', or 217" depicted in FIGS. 4-9. Thus, the media-facing surface 417 includes a first portion (not separately shown in FIG. 13) in proximity to the write portion of the main pole 420 and a second portion (not separately shown in FIG. 13) in proximity to and recessed from the recessed portion of the main pole 420. The media-facing surface 417 of the auxiliary pole 416 is not conformal with the media-facing surface 421 of the main pole 420. Instead, the second portion that is distal from the write portion of the main pole is recessed from the recessed portion of the main pole 420. Further, the second portion of the media-facing surface 417 that is distal from the write portion of the main pole 420 may increase distance from the ABS with increasing distance from the pole tip. The first portion of the write surface 417 may have approximately the same width as the flared region of the main pole 420. This portion also may, or may not be conformal with the flared region of the main pole 420.

In addition, the media-facing surface 417 of the auxiliary pole 416 is tapered such that the media-facing surface 417 is farther from the ABS with increasing distance from the main pole 420. Thus, the auxiliary pole 416 is analogous to the auxiliary pole 316 depicted in FIG. 10. Referring back to FIG.

13, the media-facing surface 417 is farther from the ABS in a downward direction from the main pole 420. In the embodiment shown, the taper is such that the media facing surface 417 is stepped down. In one embodiment, the taper angle, $\phi$, is at least thirty degrees and not more than seventy degrees. In another embodiment, the taper angle, $\phi$, is not more than sixty degrees. In one embodiment, the taper angle, $\phi$, is approximately forty-five degrees.

Because of the configuration of the poles 416 and 420, the head 400 may exhibit performance improvements analogous to those that may be achieved for the heads 100, 100', 100", 200, 200', and 200". The configuration of the main pole 420 may reduce the domain lockup of the write transducer 410. The configuration of the auxiliary pole may reduce adjacent track writing and improve flux choking, as described above. In addition, use of the taper may allow for a thicker auxiliary pole 416 without placing additional magnetic charges in proximity to the media (not shown). Because the auxiliary pole 416 is tapered, magnetic charges near the bottom of the auxiliary pole 416 are recessed from the ABS and, therefore, the media. Consequently, even if the auxiliary pole 416 has increased thickness, the bottom portion of the auxiliary pole 416 may not contribute to the field near the tip of the main pole 420. Thus, adjacent track writing may be improved.

Figure 14:
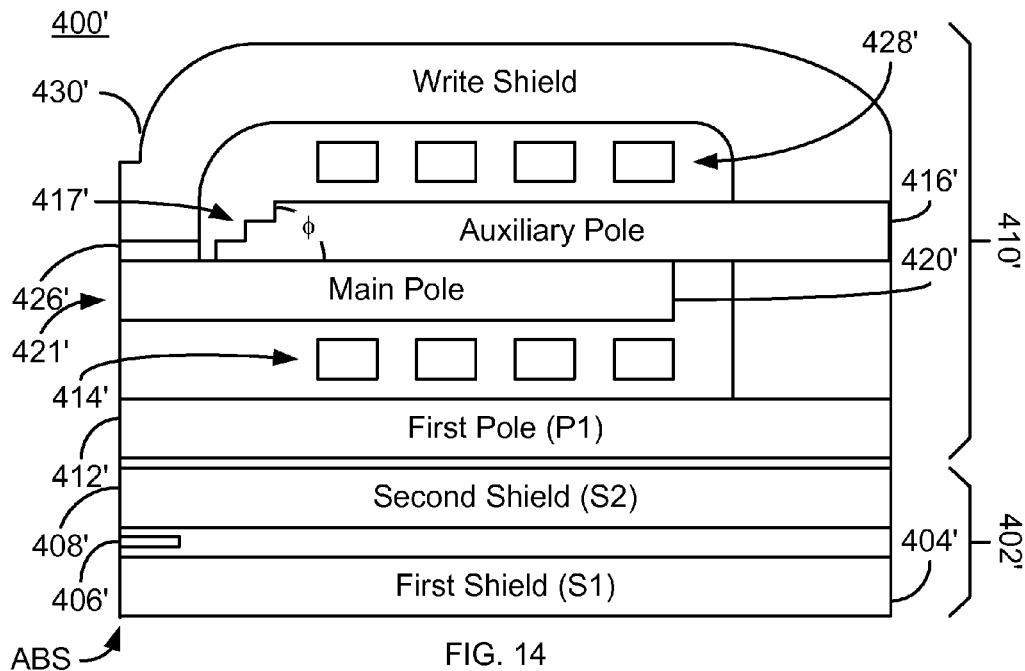
FIG. 14 is a side view of another exemplary embodiment of a magnetic recording head.

FIG. 14 is a side view of another exemplary embodiment of a magnetic recording head 400'. For clarity, FIG. 14 is not drawn to scale. The magnetic recording head 400' is analogous to the magnetic recording head 400 and, therefore, the magnetic recording heads 100, 100', 100", 200, 200', and 200". Consequently, analogous components are labeled similarly. Thus, the magnetic recording head 400' includes a read transducer 402' and a write transducer 410' that are analogous to and include similar components as the read transducer 102 and write transducer 110, respectively. The read transducer 402' includes shields 404' and 408' and read sensor 406'. The write transducer 410' includes a P1 412', a first coil 414', auxiliary pole 416', a main pole 420', write gap 426', a second coil 428', and shield 430'. Although the write transducer 410' is depicted with two coils 414' and 428', a single coil may also be used.

The main pole 420' may have a structure and function analogous to that of the main poles 120, 120', 120", 220, 220', 220", 320, 320', 320" and 420. Thus, the main pole 420' includes a media-facing surface 421' including a write portion (not separately shown in FIG. 14) and a read portion (not separately shown in FIG. 14). The write portion may include a flared region (not separately shown in FIG. 14) and pole tip (not separately shown in FIG. 14). The structure and locations of these features of the main pole 420' may be analogous to the main poles 120, 120', 120", 220, 220', 220", 320, 320', 320" and 420.

The structure and function of the auxiliary pole 416' is analogous to that of the auxiliary poles 116, 116', 116", 216, 216', 216", 316, 316', 316" and 416'. Thus, the auxiliary pole 416' also has a media-facing surface 417'. The media-facing surface 417' is analogous to the media facing surface 117, 117', 117", 217, 217', or 217" as depicted in FIGS. 4-9, as well as the media-facing surface 417. The media-facing surface 417' of the auxiliary pole 416' is not conformal with the media-facing surface 421' of the main pole 420'. In addition, the media-facing surface 417' of the auxiliary pole 416 is tapered such that the media-facing surface 417' is farther from the ABS with increasing distance from the main pole 420'. However, the auxiliary pole 416' is above the main pole 420'. Thus, as can be seen in FIG. 14, the media-facing surface 417' is farther from the ABS in an upward direction from the main pole 420'. In the embodiment shown, the taper is such that the media facing surface 417 is stepped down. In one embodiment, the taper angle, $\phi$, is at least thirty degrees and not more than seventy degrees. In another embodiment, the taper angle, $\phi$, is not more than sixty degrees. In one embodiment, the taper angle, $\phi$, is approximately forty-five degrees. In one embodiment, the taper may be omitted. A non-tapered auxiliary pole 416' may be used when the shield 430 is present. However, in other embodiments, the shield 430 may be omitted. In such an embodiment, the taper for the auxiliary pole 416' may have greater utility.

Because of the configuration of the poles 416' and 420', the head 400' may exhibit performance improvements analogous to those that may be achieved for the heads 100, 100', 100", 200, 200', 200", 300, 300', 300", and 400. The configuration of the main pole 420 may reduce the domain lockup of the write transducer 410. In addition, the head 400' may have reduced adjacent track writing and improved flux choking. In addition, use of the taper may allow for a thicker auxiliary pole 416' without placing additional magnetic charges in proximity to the media (not shown). Consequently, even if the auxiliary pole 416' has increased thickness, the bottom portion of the auxiliary pole 416' may not contribute to the field near the tip of the main pole 420'. Thus, adjacent track writing may be improved.

Figure 15:
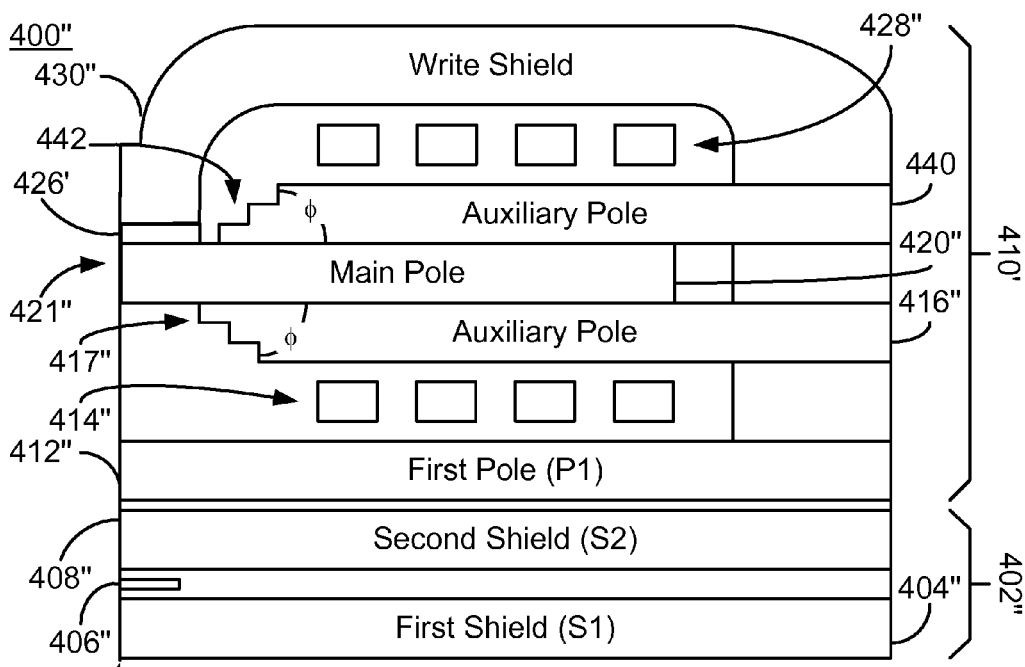
FIG. 15 is a side view of another exemplary embodiment of a magnetic recording head.

FIG. 15 is a side view of another exemplary embodiment of a magnetic recording head 400". For clarity, FIG. 15 is not drawn to scale. The magnetic recording head 400" is analogous to the magnetic recording heads 400 and 400' and, therefore, the magnetic recording heads 100, 100', 100", 200, 200', 200", 300, 300', and 300". Consequently, analogous components are labeled similarly. Thus, the magnetic recording head 400" includes a read transducer 402" and a write transducer 410" that are analogous to and include similar components as the read transducer 102 and write transducer 110, respectively. The read transducer 402" includes shields 404" and 408" and read sensor 406". The write transducer 410" includes a P1 412", a first coil 414', a first auxiliary pole 416", a main pole 420", write gap 426", a second coil 428", and shield 430". In addition, the write head 410' includes an additional auxiliary pole 440. Thus, the main pole 320" is sandwiched between the auxiliary poles 416" and 440. Although the write transducer 410" is depicted with two coils 414" and 428", a single coil may also be used.

The main pole 420" may have a structure and function analogous to that of the main poles 120, 120', 120", 220, 220', 220", 320, 320', 320", 420, and 420'. Thus, the main pole 420' includes a media-facing surface 421' including a write portion (not separately shown in FIG. 15) and a read portion (not separately shown in FIG. 15). The write portion may include a flared region (not separately shown in FIG. 15) and pole tip (not separately shown in FIG. 15). The structure and locations of these features of the main pole 420" may be analogous to the main poles 120, 120', 120", 220, 220', and 220".

The structure and function of the auxiliary pole 416" and/or 440 is analogous to that of the auxiliary poles 116, 116', 116", 216, 216', 216", 316, 316', 316", 416, and 416". However, the auxiliary pole 416" is below the main pole 420", while the auxiliary pole 440 is above the main pole 420". The media facing surface 417" of the auxiliary pole may not be conformal with the media-facing surface 421" of the main pole. The media-facing surface 442 of the auxiliary pole may not be conformal with the media-facing surface 421" of the main pole. The auxiliary pole 416" and/or the auxiliary pole 440 my have the cross-sections, as viewed from the top, as any of the poles 116, 116', 116", 216, 216', 216". In one embodiment, the cross-sections, as viewed from the top, of the auxiliary pole 416" and 440 may be the same. In another embodiment, the cross-sections, as viewed from the top, of the auxiliary pole 416" and 440 may be different. Further, in one embodiment, one cross-section for a pole 416" or 440 is conformal with the main pole 420", while the other is not.

The media-facing surface 417" of the auxiliary pole 416" is tapered such that the media-facing surface 417" is farther from the ABS with increasing distance from the main pole 420'. The media-facing surface 442 of the auxiliary pole 440 may be tapered in an analogous manner, particularly if the shield 430" is omitted. Thus, as can be seen in FIG. 15, the media-facing surface 417' is farther from the ABS in a downward direction from the main pole 420'. Similarly, the media-facing surface 442 may be farther from the ABS in an upward direction from the main pole 420". In another embodiment only one of the auxiliary poles 416" and 440 is tapered. For example, in one embodiment, the auxiliary pole 416" is tapered, but the auxiliary pole 440 is not. In another embodiment, the auxiliary pole 440 is tapered, but the auxiliary pole 416" is not. In the embodiment shown, the tapers are such that the media facing surfaces 417" and 442 are stepped down. However, in another embodiment, one of the auxiliary poles 416" and 440 may be tapered linearly. In one embodiment, the taper angles, φ, is at least thirty degrees and not more than seventy degrees. In another embodiment, the taper angle, φ, is not more than sixty degrees. In one embodiment, the taper angle, φ, is approximately forty-five degrees.

Because of the configuration of the poles 416", 420", and 440, the head 400" may exhibit performance improvements analogous to those that may be achieved for the heads 100, 100', 100", 200, 200', 200", 300, 300', 300", 400, and 400'. In particular, domain lockup, flux choking, and adjacent track writing may be improved.

Figure 16:
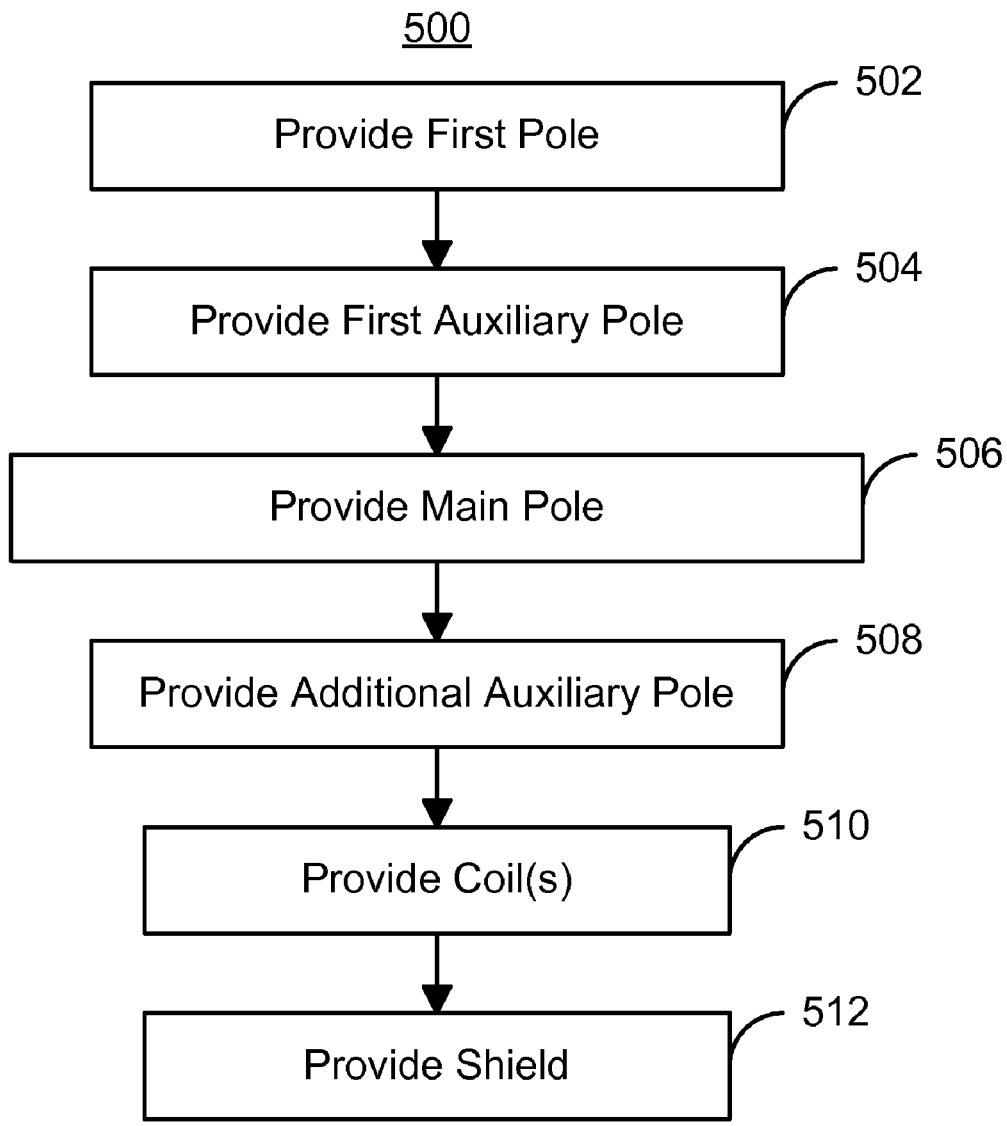
FIG. 16 is a flow chart depicting an exemplary embodiment of a method for fabricating a magnetic recording head.

FIG. 16 is a flow chart depicting an exemplary embodiment of a method 500 for fabricating a magnetic recording head. The method 500 is described in the context of particular steps having a certain order. However, the steps could be performed in another order. In addition, certain steps may be omitted, combined with other steps, and/or added.

The P1 112/112'/112"/212/212'/212"/312/312'/312"/412/412'/412" is provided, via step 502. The auxiliary pole 116/116'/116"/216/216'/216"/316/316'/316"/416/416'/416" is provided, via step 504. Step 504 may include forming various portions of the auxiliary pole 116/116'/116"/216/216'/216"/316/316'/316"/416/416'/416". For example, step 504 may include forming the media-facing surface 117/117'/117"/217/217'/217"/317/317'317"/417/417'/417". The main pole 120/120'/120"/220/220'/220"/320/320'/320"/420/420'/420" is provided, via step 506. Step 506 includes forming various portions of the main pole 120/120'/120"/220/220'/220"/320/320'/320"/420/420'/420", for example the media-facing surface 121/121'/121"/221/221'/221"/321/321'/317"/417/417'/417". In some embodiments, the additional auxiliary pole 340/440 may optionally be formed, via step 508. Step 508 may include forming structures within the additional auxiliary pole 340. For example, the media-facing surface 342/442 and any structures therein may be formed using step 508. The coil(s) 114/114'/114"/214/214'/214"/314/314'/314"/414/414'/414" as well as the coils 128/128'/128"/228/228'/228'/328/328'/328"/328/428'/428" are provided, via step 510. Thus, a portion of step 510 that is used to form the coils 114/114'/114"/214/214'/214"/314/314'/314"/414/414'/414" may be performed prior to formation of the main pole 120/120'/120"/220/220'/220"/320/320'/320"/420/420'/420". In addition, the portion of the step 510 that is used in forming the coils 128/128'/128"/228/228'/228"/328/328'/328"/428/428'/428" may be performed after formation of the main pole 120/120'/120"/220/220'/220"/320/320'/320"/420/420'/420".

The shield 130/130'/130"/230/230'/230"/330/330'/330"/430/430'/430" may then optionally be formed, via step 512. Formation of the head 100/100'/100"/200/200'/200"/300/300'/300"/400/400'/400" may then be completed. For example, the shield 130/130'/130"/230/230'/230"/330/330'/330"/430/430'" may be formed.

Using the method 500, the heads 100, 100', 100", 200, 200', 200", 300, 300', 300", 400, 400', and/or 400" may be provided. Thus, the benefits of the heads 100, 100', 100", 200, 200', 200", 300, 300', 300", 400, 400', and 400" such as improvements in domain lockup, flux choking, and adjacent track writing, may be achieved.

Thus, the heads 100, 100', 100", 200, 200', 200", 300, 300', 300", 400, 400', and 400" and the method 500 may be used to improve domain lockup, flux choking, and adjacent track writing. Different features, such as differing tapers and/or media-facing surfaces, are shown in each head 100, 100', 100", 200, 200', 200", 300, 300', 300", 400, 400', and 400". However, various combinations of the features of the heads 100, 100', 100", 200, 200', 200", 300, 300', 300", 400, 400', and 400" may be combined. Such combinations may exhibit analogous improvements in domain lockup, flux choking, and/or adjacent track writing.

We claim:

1. A magnetic transducer for recording to media, the magnetic transducer comprising:
   a first pole;
   a main pole having a first media-facing surface including a recessed portion and a write portion;
   an auxiliary pole magnetically coupled with the main pole, the auxiliary pole having a second media-facing surface including a first portion and a second portion, the first portion in proximity to the write portion of the first media-facing surface of the main pole, the second portion in proximity to and recessed from the recessed portion of the first media-facing surface of the main pole;
   at least one coil for energizing the main pole; and
   an additional auxiliary pole magnetically coupled with the main pole, the main pole residing between the first pole and the additional auxiliary pole.

2. The magnetic transducer of claim 1 wherein the write portion includes a pole tip having a front configured to be in closest proximity to the media.

3. The magnetic transducer of claim 2 wherein the second portion of the second media-facing surface of the auxiliary pole is recessed from the pole tip by an amount that increases with increasing distance from the pole tip.

4. The magnetic transducer of claim 3 wherein the amount increases linearly.

5. The magnetic transducer of claim 3 wherein the amount increases in steps.

6. The magnetic transducer of claim 2 wherein the write portion of the first media-facing surface of the main pole includes a flared region having the pole tip and an angled portion.

7. The magnetic transducer of claim 6 wherein the first portion of the second media-facing surface of the auxiliary pole is recessed from the flared region.

8. The magnetic transducer of claim 7 wherein the second portion of the second media-facing surface of the auxiliary pole is recessed from the pole tip by an amount that increases with increasing distance from the pole tip.

9. The magnetic transducer of claim 8 wherein the amount increases linearly.

10. The magnetic transducer of claim 8 wherein the amount increases in steps.

11. The magnetic transducer of claim 6 wherein the first portion of the second media-facing surface of the auxiliary pole is conformal with the angled portion.

12. The magnetic transducer of claim 11 wherein the second portion of the second media-facing surface of the auxiliary pole is recessed from the pole tip by an amount that increases with increasing distance from the pole tip.

13. The magnetic transducer of claim 12 wherein the amount increases linearly.

14. The magnetic transducer of claim 12 wherein the amount increases in steps.

15. The magnetic transducer of claim 1 wherein at least the first portion of the second media-facing surface of the auxiliary pole is tapered to recede from the first media-facing surface of the main pole as a distance from the main pole increases.

16. The magnetic transducer of claim 1 wherein the main pole resides between the auxiliary pole and the first pole.

17. The magnetic transducer of claim 1 wherein the auxiliary pole resides between the main pole and the first pole.

18. The magnetic transducer of claim 11 further comprising: A magnetic transducer for recording to media, the magnetic transducer comprising:
 a first pole;
 a main pole having a first media-facing surface including a recessed portion and a write portion, the write portion includes a pole tip having a front configured to be in closest proximity to the media, and a flared region having the pole tip and an angled portion;
 an auxiliary pole magnetically coupled with the main pole, the auxiliary pole having a second media-facing surface including a first portion and a second portion, the first portion in proximity to the write portion of the first media-facing surface of the main pole, the second portion in proximity to and recessed from the recessed portion of the first media-facing surface of the main pole, the first portion of the second media-facing surface being conformal with the angled portion of the main pole;
 at least one coil for energizing the main pole; and
 an additional auxiliary pole magnetically coupled with the main pole, the main pole residing between the first pole and the additional auxiliary pole.

19. A magnetic transducer for recording to media, the magnetic transducer comprising:
 a first pole;
 a main pole having a first media-facing surface including a recessed portion and a write portion, the write portion includes a pole tip having a front configured to be in closest proximity to the media, and a flared region having the pole tip and an angled portion;
 an auxiliary pole magnetically coupled with the main pole, the auxiliary pole having a second media-facing surface including a first portion and a second portion, the first portion in proximity to the write portion of the first media-facing surface of the main pole, the second portion in proximity to and recessed from the recessed portion of the first media-facing surface of the main pole, the first portion of the second media-facing surface being conformal with the angled portion of the main pole;
 at least one coil for energizing the main pole, the second portion of the second media-facing surface being recessed from the pole tip by an amount that increases with increasing distance from the pole tip; and
 an additional auxiliary pole magnetically coupled with the main pole, the main pole residing between the first pole and the additional auxiliary pole, wherein the additional auxiliary pole includes
 a third media-facing surface including a third portion and a fourth portion, the third portion in proximity to the write portion of the main pole, the fourth portion in proximity to and recessed from the recessed portion of the main pole.

20. A magnetic transducer for recording to media, the magnetic transducer comprising:
 a first pole;
 a main pole having a first media-facing surface including a recessed portion and a write portion, the write portion includes a pole tip having a front configured to be in closest proximity to the media;
 a first auxiliary pole magnetically coupled with the main pole, the first auxiliary pole having a second media-facing surface including a first portion and a second portion, the first portion in proximity to the write portion of the main pole, the second portion in proximity to and recessed from the recessed portion of the main pole, at least the first portion of the second media-facing surface of the auxiliary pole being tapered to recede from the first media-facing surface of the main pole as a first distance from the main pole increases, the second portion of the second media-facing surface of the auxiliary pole being recessed from the pole tip by a first amount that increases with increasing distance from the pole tip;
 a second auxiliary pole magnetically coupled with the main pole, the second auxiliary pole having a third media-facing surface including a third portion and a fourth portion, the third portion in proximity to the write portion of the main pole, the fourth portion in proximity to and recessed from the recessed portion of the main pole, at least the third portion of the third media-facing surface of the auxiliary pole being tapered to recede from the first media-facing surface of the main pole as a second distance from the main pole increases, the third portion of the third media-facing surface of the auxiliary pole being recessed from the pole tip by a second amount that increases with increasing distance from the pole tip;
 at least one coil for energizing the main pole.

21. A method for providing a magnetic transducer for recording to media, the method comprising:
 providing a first pole;
 providing a main pole having a first media-facing surface including a recessed portion and a write portion;
 providing an auxiliary pole magnetically coupled with the main pole, the auxiliary pole having a second media-facing surface including a first portion and a second portion, the first portion in proximity to the write portion of the main pole, the second portion in proximity to and recessed from the recessed portion of the main pole; and
 providing at least one coil for energizing the main pole; and
 providing an additional auxiliary pole magnetically coupled with the main pole, the main pole residing between the first pole and the additional auxiliary pole, the auxiliary pole residing between the main pole and the first pole.

22. The method of claim 21 wherein the auxiliary pole providing further includes:
 recessing the second portion of the second media-facing surface of the auxiliary pole from the pole tip by an amount that increases with increasing distance from the pole tip.

23. The method of claim 21 wherein the auxiliary pole providing further includes:
tapering at least the first portion of the second media-facing surface of the auxiliary pole to recede from the first media-facing surface of the main pole.

24. A method for providing a magnetic transducer for recording to media, the method comprising:
providing a first pole;
providing a main pole having a first media-facing surface including a recessed portion and a write portion, the write portion includes a pole tip having a front configured to be in closest proximity to the media;
providing a first auxiliary pole magnetically coupled with the main pole, the first auxiliary pole having a second media-facing surface including a first portion and a second portion, the first portion in proximity to the write portion of the main pole, the second portion in proximity to and recessed from the recessed portion of the main pole, at least the first portion of the second media-facing surface of the auxiliary pole being tapered to recede from the first media-facing surface of the main pole as a first distance from the main pole increases, the second portion of the second media-facing surface of the auxiliary pole being recessed from the pole tip by a first amount that increases with increasing distance from the pole tip;
providing a second auxiliary pole magnetically coupled with the main pole, the second auxiliary pole having a third media-facing surface including a third portion and a fourth portion, the third portion in proximity to the write portion of the main pole, the fourth portion in proximity to and recessed from the recessed portion of the main pole, at least the third portion of the third media-facing surface of the auxiliary pole being tapered to recede from the first media-facing surface of the main pole as a second distance from the main pole increases, the third portion of the third media-facing surface of the auxiliary pole being recessed from the pole tip by a second amount that increases with increasing distance from the pole tip;
providing at least one coil for energizing the main pole.

* * * * *